United States Patent [19]
Koppe

[11] Patent Number: 5,730,869
[45] Date of Patent: Mar. 24, 1998

[54] POROUS CERAMIC FILTER

[76] Inventor: Franz Koppe, Hotzaberg 9, D-92676 Eschenbach Oberpfalz, Germany

[21] Appl. No.: 585,370

[22] Filed: Jan. 11, 1996

[30] Foreign Application Priority Data

Jan. 28, 1995 [EP] European Pat. Off. ............ 95101191

[51] Int. Cl.$^6$ ..................................... B01D 25/02
[52] U.S. Cl. .................. 210/345; 210/347; 210/496; 210/500.25; 210/500.26; 210/510.1; 264/44; 264/434
[58] Field of Search ............... 210/510.1, 496, 210/500.26, 500.25, 343, 344, 345, 347; 264/44, 434

[56] References Cited

U.S. PATENT DOCUMENTS 3,997,447  12/1976  Breton et al. ............ 210/503 X
5,326,512   7/1994  Stillwagon et al. ............ 264/44

FOREIGN PATENT DOCUMENTS 1455084  4/1965  France.

*Primary Examiner*—W. L. Walker
*Attorney, Agent, or Firm*—Furgang & Milde, LLP

[57] ABSTRACT

A porous ceramic filter obtainable from a thin and flat green filter material, wherein round components are punched out of the green material and stacked, leaving at least one hollow interior that can communicates with an outlet, and the stack is then sintered together into a homogeneous unit. The green material is produced by casting, the separate components are punched out of it in the form of two flat disks (2 & 3) and a ring (4) with the same outside diameter, joined subject to pressure and leaving the interior (1), and sintered into a homogeneous unit.

12 Claims, 3 Drawing Sheets

5,730,869

POROUS CERAMIC FILTER

BACKGROUND OF THE INVENTION

The present invention concerns a porous ceramic filter obtainable from a thin and flat green (unsintered) filter material. Round components are punched out of the green material and stacked, leaving at least one hollow interior that communicates with an outlet. The stack is then sintered together into a homogeneous unit.

A ceramic filter of this type is known from U.S. Pat. No. 5,326,512. The compound is homogenized in an extruder and flattened into a thin and flat green material by rollers. The green material is then deep-drawn and the components are then punched out, stacked, and combined into a filter tube. The tube has radial outward opening in-flow channels, wherein a cake accumulates as the filter is employed. The cake is difficult to remove. Dimensional stability is also not very satisfactory. The walls are more than 3 mm thick, which makes cleaning difficult and the filter itself less efficient. The patent does not mention rotating the filter, which would not even make sense in terms of increasing its efficiency.

A filter of thermoplastic powder is known from French Patent No. 1,455,084. It is molded onto the outside of a core and the overall shape is stabilized by sintering. The core is then dissolved out, leaving a hollow shape. The interior can communicate with an outlet. This procedure is very complicated and has not attained a high degree of acceptance.

Another known ceramic filter is tubular. It is extruded out of particles of ceramic and sintered. The particles are secured together by an organic binder until they sinter. Considerations of strength make it difficult to manufacture ceramic filters that not only provide sufficient surface but also have particularly thin walls, less than 2 mm. The hydraulic impedance offered to the raw solution by such filters accordingly increases with their overall size. The resulting poor energy equilibrium makes them less than satisfactory. Furthermore, the cake that deposits on the upstream surface of even a properly employed filter cannot be removed just by reverse flushing, and can even burst the filter.

Ceramic filters are primarily employed for microfiltration and ultrafiltration. They are outstanding for their chemical and thermal stability. They can accordingly be employed with organic solvents and in the hot and aggressive processing media used in chemical engineering as well as in the foodstuffs industry, where steam sterilization considerably stresses the filter media.

SUMMARY OF THE INVENTION

A principal object of the present invention is to provide an improved ceramic filter of the aforesaid type with the same chemical and thermal resistance but with essentially more available surface and less hydraulic impedance. Preferably, the filter shall also be easy to manufacture.

This object, as well as other objects which will become apparent from the discussion that follows, are achieved, in accordance with the present invention, by a porous filter which is formed of (1) two flat, round disks having the same external diameter and disposed in spaced-apart plane parallel relationship with their peripheral edges and alignment and (2) a ring extending between the peripheral edges of the two disks and defining an enclosed space between them. With this arrangement, the fluid to be filtered can pass from the exterior of the filter through the disks and ring to the enclosed space and from this space to the outlet.

In manufacture, the green material is produced by casting. The separate components are punched out of this material in the form of two flat disks and a ring with the same outside diameter. They are then joined, subjected to pressure and leaving the interior, and sintered into a homogeneous unit. Casting the green material renders the components very dimensionally stable and homogeneous. They are so simple that they can be very thin. The result is high efficiency and more effective cleaning. Joining and sintering subject to pressure result in high dimensional stability of the finished product as well.

The main prerequisite for this result is for mutually compatible or identical greens to be used for all the components that are to joined. This requirement is easy to comply with. The result is a filter that is distinguished not only by particularly great strength but also by outstanding dimensional stability. This is a particular advantage in a rotating filter.

The filter consists of two flat, separate, and essentially parallel plates fastened together and sealed at their circumference by at least one ring. The disks and rings can be produced from such known starting materials as aluminum oxide. They must be supported entirely flat while they are being produced. The disks can accordingly be as thin as approximately 0.5 to 1 mm, which results in very weak hydraulic impedance.

It is possible in spite of their thinness to provide the disks with an essentially in-itself asymmetrical stacked structure, with the radii of the pores in the upstream surface shorter than those of the pores in the downstream side for example. These pores will generally be measured in nanometers or micrometers. The hydraulic impedance that occurs even when the filter is being properly used can accordingly be reduced even further without detriment to the degree of precipitation.

The areas of the disks enclosed by the ring can be fastened together by at least one spacer. The active filter surface available for filtration, the size of the filter, that is, can accordingly be increased with no risk of breakage. It will be practical for the spacer to comprise several components distributed in a pattern over the area surrounded by the ring. Efficiency can be optimized particularly simply when the shortest distances between adjacent components are equal in all directions. Optimization is intended to ensure that as much of the disks as possible will be subject to uniform load up to the threshold of static supporting strength even when the filter is being properly employed. The disks can accordingly be thinner and the hydraulic impedance lower. The space available outside the components is preferably in the form of communicating canals.

It has been demonstrated to be practical for the filter to have a round circumference concentric with the outlet. Such an embodiment is very simple to set rotating around the outlet to decrease the risk of deposits on the upstream surface occurring while the filter is being properly used.

The outlet can be surrounded by another spacer, elevated, on at least one of the disks, that can be sealed to another filter of the same structure or to an outlet. A cascade can be constructed from as many matching filters of this type as desired in order to elevate the filter's output as much as desired, whereby the filters will function in parallel.

Such filters can be combined and replaced particularly easily when they are essentially mirror-symmetrical and when their outlets are provided with subsidiary exits that open axially in both directions. They can in such an embodiment be slid onto a tube by way of the subsidiary exits and optionally replaced along with it when necessary. It will also be of advantage for the tube to be metal. It can be hollow and convey fluid in communication with the filters. The efficiency of such a module can accordingly be considerable in some situations. An all-ceramic version is also possible. This version will be particularly practical when the coefficients of thermal expansion must be identical throughout or when particularly high chemical and/or thermal strength is necessary.

The essential advantages of the ceramic filter in accordance with the present invention are its simplicity of manufacture, excellent hydraulic permeability, and potential for expanding the active filtering area almost without limit without detriment to mechanical strength. All versions can be reverse-rinsed without any problem and are accordingly easy to clean. They can be employed to filter either liquids or gases in cross-flow or in dead-end operation, and for any type of separation, depending on the type of filter material. Examples include micro-, ultra-, nano-, and hyperfiltration, pervaporation, pertraction, and dialysis. Rotationally symmetrical embodiments can be employed as rotation filters, with the filter rotating more rapidly relative to the raw solution, resulting in a high flow-over rate accompanied by powerful shearing and fouling of the upstream surface. Entirely ceramic embodiments can be of any size and highly heat-resistant. Cascaded ceramic filters, due to their low dead volume, occupy very little space and are very efficient. Their disks are usually only approximately 0.5 mm thick and are separated by approximately 0.2 to 1 mm in the assembled filter. When several such filters are combined into an independent module, by stringing them along a tube for example, they can be separated by similar distances, 0.4 to 2 mm for example, depending on the viscosity of the raw solution.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
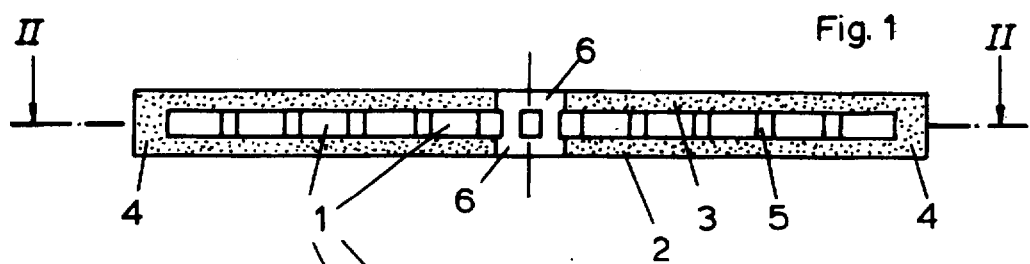
FIG. 1 is a longitudinal section through a preferred embodiment of the filter according to the present invention.
Figure 2:
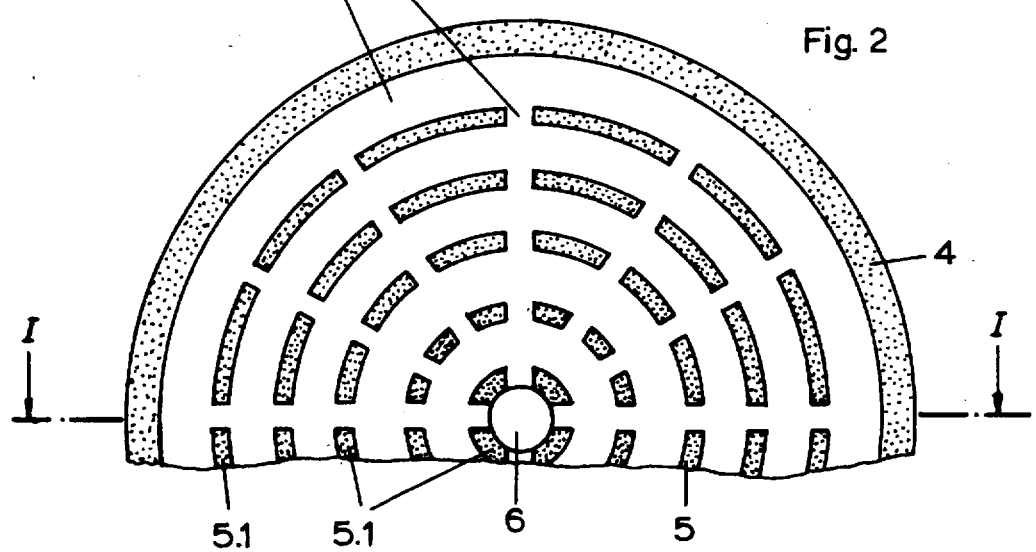
FIGS. 2 and 2a are transverse sections through a filter of the type illustrated in FIG. 1.

The preferred embodiments of the present invention will now be described with reference to FIGS. 1-5 of the drawings. Identical elements in the various figures are designated with the same reference numerals.

The porous ceramic filter according to the present invention and illustrated in FIGS. 1-5 is flat, round, and hollow. The interior 1 of the filter has two outlets 6. It comprises two flat and essentially parallel disks 2 and 3 fastened together fluid-tight by a ring 4 at the circumference and by a spacer 5 in the form of several subsidiary components 5.1 distributed in a pattern over the area within the circumference. Subsidiary components 5.1 are separated by no more than 20 mm, providing a great deal of stability to disks 2 and 3, which will accordingly extensively maintain their shape when the medium being filtered presses against their outer surface or when the reverse flush presses against the surfaces of interior 1. The structure of the filter is homogeneous. It consists, not only in the vicinity of disks 2 and 3 but also in that of ring 4 and spacer 5, of a mass of material that merges smoothly with itself. It accordingly exhibits not only particularly high mechanical and thermal strengths but also dimensional stability and long life, which helps to avoid imbalance phenomena. Its employment in a rotation filter is accordingly facilitated.

Figure 2A:
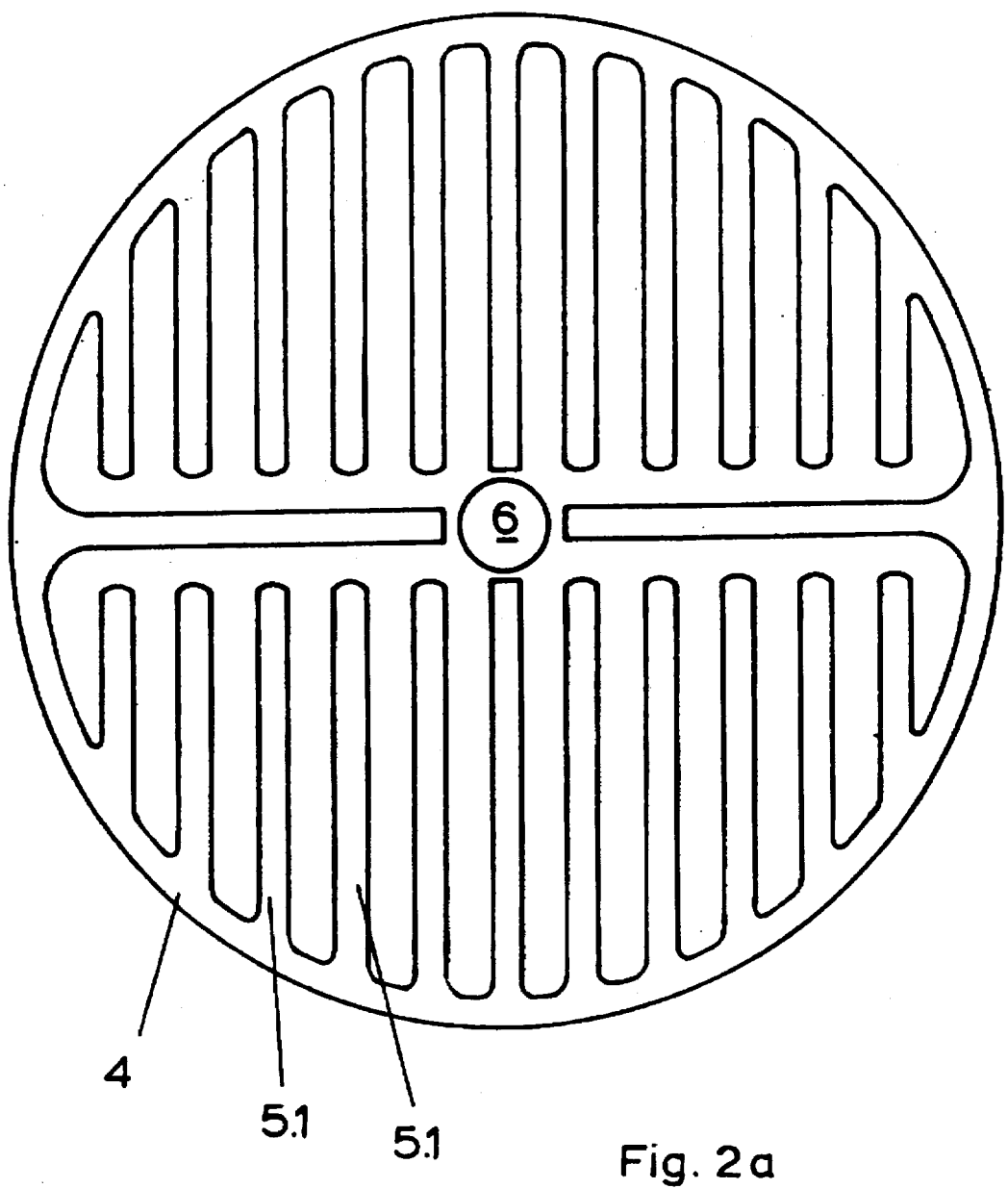

FIG. 2a illustrates an embodiment wherein ring 4 and spacer 5 merge. Spacer 5 comprises subsidiary components 5.1 separated by channel-like empty spaces. The pattern ensures mirror symmetry in two mutually perpendicular directions. Imbalance is accordingly compensated for when the filter is employed as a rotation filter.

Figure 3:
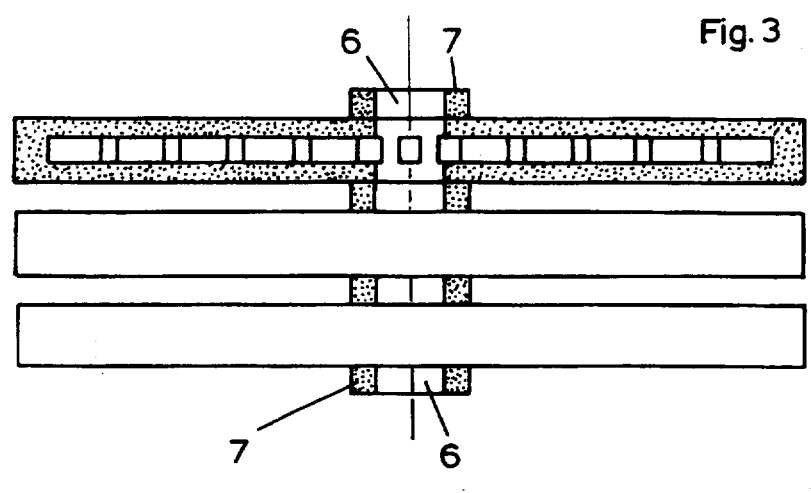
FIG. 3 is an elevational view, partly in longitudinal section, through several filters of the type illustrated in FIGS. 1 and 2 combined into a cascade and operating in parallel.

The structure illustrated in FIG. 3 results from the use of several filters of identical design separated by additional spacers 7 disposed symmetrically around outlet 6. The resulting cascade arrangement can be extended axially as far as desired.

Figure 4:
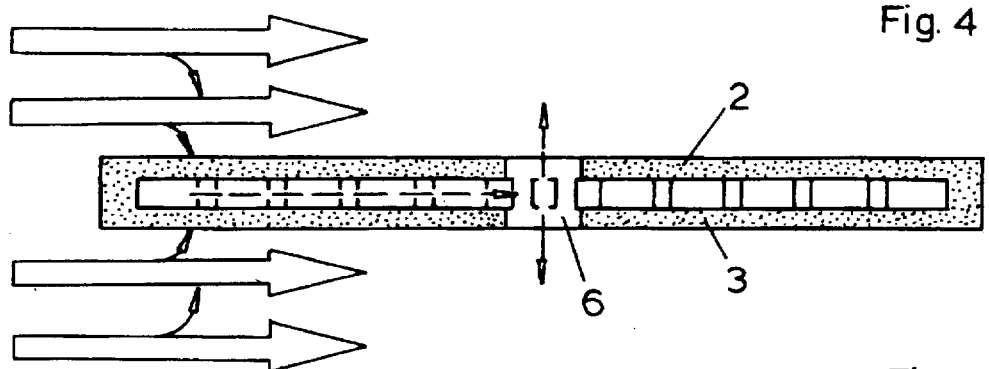
FIGS. 4 and 5 illustrate the flow inside and outside the filter of FIGS. 1 and 2, respectively, when properly used.
Figure 5:
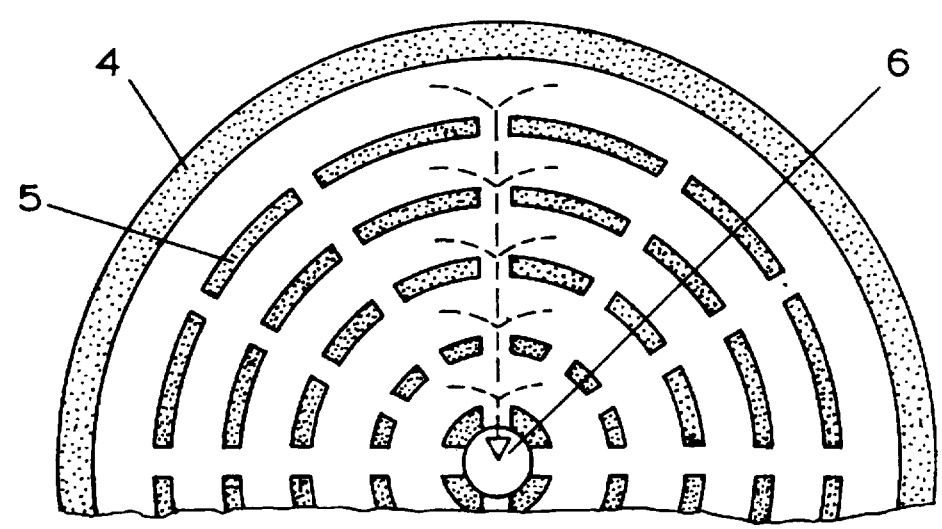

FIGS. 4 and 5 illustrate how the medium flows while a stationary or axially rotating ceramic filter is being properly employed. The raw solution being filtered flows essentially parallel to the surfaces of disks 2 and 3 in the direction indicated by the outside arrows. The filtrate precipitated out of the solution penetrates the porous structure and enters interior 1, which it leaves through the outlet 6. Filtering efficiency can be increased by subjecting the solution to pressure and by generating a vacuum in the interior 1. The filter can be reverse-rinsed by reversing the conditions, loosening and reducing any deposits adhering to the outer surfaces of disks 2 and 3.

There has thus been shown and described a novel porous ceramic filter which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of producing a porous ceramic filter from a thin and flat green filter material, wherein round components are punched out of the green material and stacked, leaving at least one hollow interior that communicates with an outlet, and the stack is then sintered together into a homogeneous unit, said method comprising the steps of casting the green material; punching out components from the green material in the form of two flat disks and a ring with the same outside diameter; joining the components together with pressure and leaving an open interior; and sintering the components into a homogeneous unit to form a filter including:

(a) the two flat, round disks having the same external diameter and disposed in spaced-apart, plane parallel relationship with their peripheral edges in alignment;

(b) the ring extending between the peripheral edges of the two disks and defining an enclosed space between the disks;

whereby fluid can pass from the exterior of the filter, through the disks and ring to the enclosed space and from this space to the outlet.

2. The method of producing a ceramic filter recited in claim 1, wherein the disks enclosed are fastened together by at least one spacer in the region of the enclosed space.

3. The method of producing a ceramic filter recited in claim 2, wherein the spacer comprises several subsidiary components distributed in a pattern over the enclosed space region surrounded by the ring.

4. The method of producing a ceramic filter recited in claim 2, wherein the ring and the spacer merge into one another.

5. The method of producing a ceramic filter recited in claim 1, wherein the filter concentrically surrounds the outlet.

6. The method of producing a ceramic filter recited in claim 5, wherein the outlet has two mirror-symmetrically opposite subsidiary exits that open axially.

7. The method of producing a ceramic filter recited in claim 5, wherein the filter can be rotated around the outlet.

8. The method of producing a ceramic filter recited in claim 3, wherein the filter comprises two essentially identically shaped disks joined mirror-symmetrically.

9. The method of producing a ceramic filter recited in claim 1, further comprising another, elevated, spacer on at least one of the disks, surrounding the outlet, and capable of being fastened, liquid-tight to either an outlet line or any other filter of the same shape.

10. The method of producing a ceramic filter recited in claim 1, comprising a composite of several such filters mounted around and along a tube with the subsidiary exits in their outlets separated and sealed off from the tube, wherein the inside of the tube communicates axially in at least one direction, and exchanges fluid, with the interiors of the individual filters.

11. The method of producing a ceramic filter recited in claim 10, wherein the tube is made of ceramic and can be detached from the filters.

12. A rotatable porous ceramic filter obtainable from thin and flat green filter material, wherein flat round disks are punched out of the green material and stacked, leaving at least one hollow interior that communicates with an outlet, and the stack is then sintered together into a homogeneous unit, said filter comprising a plurality of circular filter elements mounted around and along a tube, each filter element including:

(a) two flat, round disks of uniform thickness having the same external diameter and disposed in spaced-apart, plane parallel relationship with their peripheral edges in alignment;

(b) a ring extending between the peripheral edges of the two disks and defining an enclosed space between the disks;

wherein the inside of the tube communicates axially in at least one direction and exchanges fluid with the interiors of the individual filter elements, wherein the tube and the respective filter elements are rotatable about a central longitudinal axis, and wherein the tube is made of ceramic and can be detached from the filters;

whereby fluid can pass form the exterior of each filter element through the disks and ring to the enclosed space within the tube and from this space to the outlet.

* * * * *